United States Patent [19]

Wood

[11] Patent Number: 4,839,982
[45] Date of Patent: Jun. 20, 1989

[54] FISHING LURE

[76] Inventor: Robert G. Wood, 384 Palermo Dr., Ballwin, Mo. 63011

[21] Appl. No.: 193,821

[22] Filed: May 13, 1988

[51] Int. Cl.$^4$ .................... A01K 85/00; A01K 97/04
[52] U.S. Cl. ........................................ 43/41; 43/42.1; 43/44.2; 43/44.4; 43/44.99
[58] Field of Search .................. 43/41, 42.1, 42.41, 43/44.2, 44.4, 44.8, 44.99

[56] References Cited

U.S. PATENT DOCUMENTS

| | | | |
|---|---|---|---|
| 2,555,088 | 5/1951 | Irwin | 43/41 |
| 2,780,021 | 2/1957 | Fagg | 43/41 |
| 2,828,571 | 4/1958 | Caplan | 43/41 |
| 2,839,866 | 6/1958 | Jay | 43/41 |
| 3,195,263 | 7/1965 | Keyser | 43/41.2 |
| 3,273,277 | 9/1966 | Valentine | 43/41 |
| 3,688,430 | 9/1972 | Balch | 43/42.06 |
| 3,696,585 | 10/1972 | Ritter | 53/390 |
| 4,587,757 | 5/1986 | Lirette | 43/21.2 |
| 4,638,588 | 1/1987 | Abadie | 43/44.99 |

Primary Examiner—Nicholas P. Godici
Assistant Examiner—William Scott Andes
Attorney, Agent, or Firm—Senniger, Powers, Leavitt and Roedel

[57] ABSTRACT

A fishing lure comprising a fishhook, a bag formed of open-mesh material closed at one end and open at the other end having a drawstring for drawing the open end closed thereby enclosing at least a portion of the fishhook within the bag, and a leader attached to the fishhook and extending through the closed end of the bag. The bait may be placed on the fishhook in the bag or in the bag without being placed on the fishhook and the bag then closed by the drawstring, the bait being readily visually and/or olfactorily attractive to fish by reason of the open-mesh characteristic of the bag and the barb of the fishhook readily penetrating the bag by reason of its open-mesh characteristic for being struck by a fish.

5 Claims, 1 Drawing Sheet

FISHING LURE

BACKGROUND OF THE INVENTION

This invention relates to fishing lures and, more particularly, to an improved fishing lure for attracting fish to bait and causing the fish to strike a fishhook.

A common problem associated with fishing lures having fishhooks to which worms, insects, pieces of fish, or other organic matter are attached is that a fish can remove the bait from the fishhook without being caught. This is particularly a problem with dough baits that soften after soaking in the water for a few minutes. Another problem associated with fishing lures is the difficulty of attaching the bait, such as a live worm, to the fishhook. Many people simply do not want to attach the worm to the fishhook. There is, therefore, a need for a fishing lure having a fishhook which securely holds dough and similar baits thereto and which holds baits of all types in close proximity to the fishhook without requiring the user to directly attach the bait to the fishhook.

SUMMARY OF THE INVENTION

Among the several objects of this invention may be noted the provision of an improved fishing lure which securely holds dough and other baits, the provision of such a lure which holds bait in close proximity to the fishhook without requiring the user to directly attach the bait to the fishhook, the provision of such a lure to which bait can easily be secured, the provision of such a lure which is easy to attach to a leader or other line, and the provision of such a lure which is economical to manufacture.

Generally, a fishing lure of the present invention comprises a fishhook, a bag formed of open-mesh material closed at one end and open at the other end having means for drawing the open end closed thereby enclosing at least a portion of the fishhook within the bag, and a leader attached to the fishhook and extending through the closed end of the bag. The bait may be placed on the fishhook in the bag or in the bag without being placed on the fishhook and the bag then closed by the means, the bait being readily visually and/or olfactorily attractive to fish by reason of the open-mesh characteristic of the bag. The barb of the fishhook readily penetrates the bag by reason of its open-mesh characteristic for being struck by a fish.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
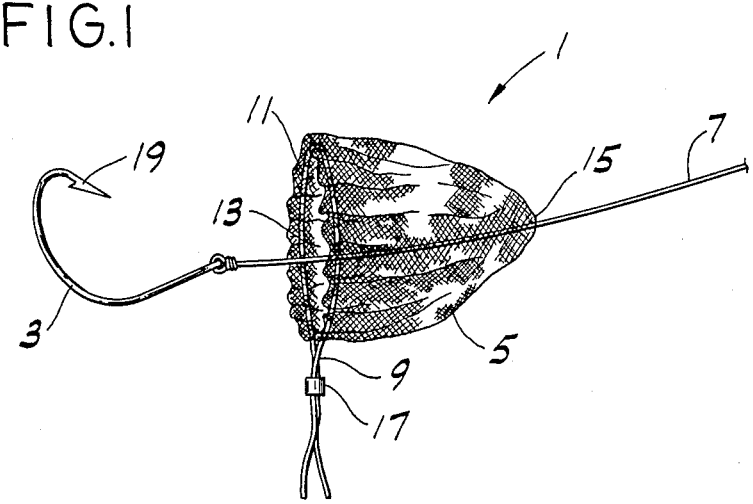
FIG. 1 is a view illustrating a fishing lure of this invention associated with the leader of a fishing line.

Referring to the drawings, particularly FIG. 1, a fishing lure of the present invention is designated in its entirety by reference numeral 1. As illustrated, the fishing lure generally comprises a fishhook 3, a bag 5 formed of open-mesh material adapted to hold the fishhook 3 and bait B therein, and a leader 7. The leader 7 is attached to the fishhook 3 and extends through the bag 5 to enable connection of the fishhook and bait B inside the bag to a fishing line (not shown).

Figure 2:
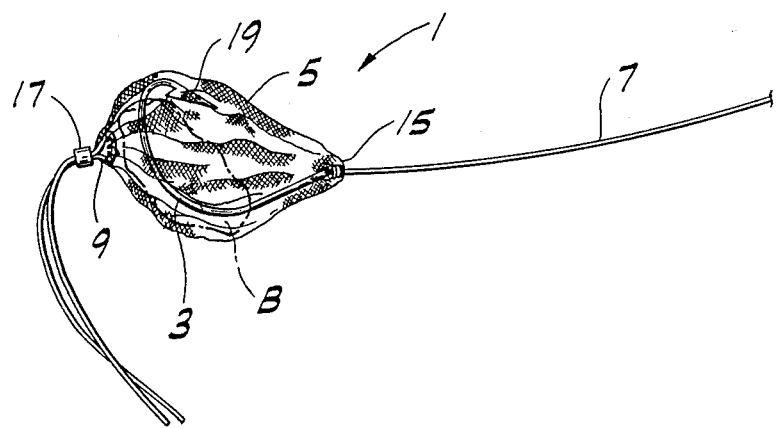
FIG. 2 is a view of FIG. 1 showing the fishing lure closed with a fishhook and bait therein.

The open-mesh material which forms the bag 5 is generally circular and preferably formed of relatively fine mesh plastic netting. A drawstring 9, preferably formed of waxed string or the like, is threaded through the periphery 11 of the material to facilitate drawing together of the periphery thereby forming the bag 5 as shown in FIG. 1, the bag having an open end 13, defined by the periphery, and a closed end 15. Further drawing of the material together will cause the open end 13 of the bag 5 to close as shown in FIG. 2.

The ends of the drawstring 9 extend through the opening in a bead 17 formed of resilient material. The opening in the bead 17 is smaller than the combined thickness of the two ends of the drawstring 9 so that the bead 17 squeezes the drawstring thereby producing resistance to relative movement between the bead and drawstring to facilitate adjustment of the size of the opening 13 of the bag 5.

The leader 7 extends through the closed end 15 of the bag 5 allowing relative movement between the bag and leader 7 to facilitate receipt of the fishhook 3 and bait B in the bag 5, which will be described hereinafter. The bag 5 is oriented on the leader 7 with the open end 13 toward the end of the leader having the fishhook 3.

The bait B may be placed on the fishhook 3 in the bag 5 or in the bag without being placed on the fishhook. To place the bait B in the bag 5 and on the fishhook 3, the bag 5 is moved away from the fishhook and the bait B placed thereon with the fishhook outside the bag. Once the bait B is secured to the fishhook 3, the bag 5 is moved toward the fishhook so that the fishhook with the bait B attached is received in the bag through the opening 13. The opening 13 is then closed by sliding the bead 17 along the drawstring 9 toward the periphery 11 of the bag 5 causing the periphery to be drawn together.

Alternatively, the bait B and the fishhook 3 may be separately placed in the bag 5 without securing the bait to the fishhook. The opening 13 is then closed by drawing the periphery together as described above.

When the bag 5 with bait B therein is placed in water, the open-mesh material enables the water to freely circulate into and out of the bag enabling the bait B to be readily visually and/or olfactorily attractive to fish. The open-mesh material also allows the barb 19 of the fishhook 3 to penetrate the bag 5 and extend outside thereof increasing the likelihood that a fish, attracted to the bag by the bait B, will strike the fishhook and be caught thereon.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fishing lure comprising a fishhook with a pointed end, a bag having sidewalls formed of open-mesh material closed at one end and open at the other end and having means for drawing the open end closed thereby enclosing the fishhook within the bag, and a leader attached to the fishhook and extending through a sidewall of the bag, such that the bag is slideably mounted solely on the leader, whereby bait may be placed on the fishhook in the bag or in the bag without being placed on the fishhook and the bag then closed by said means, the bait being readily visually and/or olfactorily attractive to fish by reason of the open-mesh characteristic of the bag, and the pointed end of the fishhook readily penetrating the bag by reason of its open-mesh characteristics for hooking a fish.

2. A fishing lure as set forth in claim 1 wherein said means comprises a drawstring.

3. A fishing lure a set forth in claim 1 wherein the bag is made of relatively fine mesh plastic netting.

4. A fishing lure as set forth in claim 3 wherein said means comprises a drawstring.

5. In combination with a fishing line having a fishhook at the end, a bait holder comprising: a piece of flexible web material of sufficient size and shape to form a bag for completely enclosing the fishhook and bait, the fishing line extending through the material to secure the bag to the fishing line, such that the bag is slideably mounted solely on the fishing line; and a drawstring extending in a loop around the material generally adjacent the marginal edges of the material, the drawstring being adapted to draw the marginal edges of the material together to form the bag for enclosing the fishhook and bait, the drawstring permitting the mouth of the bag to be opened to receive bait and closed to retain the bait in the bag.

* * * * *